(12) United States Patent
Minami

(10) Patent No.: US 9,290,412 B2
(45) Date of Patent: Mar. 22, 2016

(54) METHOD OF PROCESSING TEMPERED GLASS AND DEVICE OF PROCESSING TEMPERED GLASS

(75) Inventor: Hironori Minami, Kasuya gun (JP)

(73) Assignee: CERON Technologies Inc., Tokyo (JP)

( * ) Notice: Subject to any disclaimer, the term of this patent is extended or adjusted under 35 U.S.C. 154(b) by 0 days.

(21) Appl. No.: 14/414,757

(22) PCT Filed: Aug. 31, 2012

(86) PCT No.: PCT/JP2012/072137
§ 371 (c)(1),
(2), (4) Date: Jan. 14, 2015

(87) PCT Pub. No.: WO2014/033905
PCT Pub. Date: Mar. 6, 2014

(65) Prior Publication Data
US 2015/0166392 A1 Jun. 18, 2015

(51) Int. Cl.
*B28D 1/14* (2006.01)
*C03C 17/00* (2006.01)
(Continued)

(52) U.S. Cl.
CPC . *C03C 17/00* (2013.01); *B28D 1/14* (2013.01); *C03B 33/037* (2013.01); *G05B 19/418* (2013.01); *G05B 2219/45009* (2013.01); *Y10T 409/303752* (2015.01); *Y10T 409/304312* (2015.01)

(58) Field of Classification Search
CPC .......... B24B 7/241; B24B 7/242; B24B 1/00; C03B 33/037; C03B 17/00; B28D 1/14; G05B 19/418; G05B 2219/45009; Y10T 409/303752; Y10T 409/304312

USPC ........ 451/41, 54, 5, 64; 409/141; 408/17, 700
See application file for complete search history.

(56) References Cited

U.S. PATENT DOCUMENTS

| | | | |
|---|---|---|---|
| 6,776,563 B2 * | 8/2004 | Shamoto et al. | 409/293 |
| 7,340,985 B2 * | 3/2008 | Claesson et al. | 82/163 |
| 2004/0155558 A1 * | 8/2004 | Cuttino et al. | 310/317 |

(Continued)

FOREIGN PATENT DOCUMENTS

| | | | | |
|---|---|---|---|---|
| JP | 2002-346817 A | | 12/2002 | |
| JP | 2002346817 A | * | 12/2002 | ............... B23C 3/00 |

(Continued)

OTHER PUBLICATIONS

International Search Report dated Oct. 9, 2012, issued in corresponding application No. PCT/JP2012/072137.

(Continued)

*Primary Examiner* — Monica Carter
*Assistant Examiner* — Marcel Dion
(74) *Attorney, Agent, or Firm* — Westerman, Hattori, Daniels & Adrian, LLP

(57) ABSTRACT

To provide a method of processing a tempered glass in a simple and appropriate manner while a degree of freedom of processing is secured.
Vibration of the processing device is controlled in a feedback fashion such that a vibration amplitude and a vibration frequency of the processing device approach to a target vibration amplitude and a target vibration frequency not to keep them in a range where a value of worsening the quality is generated. Further, a specified sample cycle of 0.3 msec or less in the feedback control is employed.

3 Claims, 20 Drawing Sheets

(51) Int. Cl.
*C03B 33/037* (2006.01)
*G05B 19/418* (2006.01)

(56) References Cited

U.S. PATENT DOCUMENTS

2010/0288101 A1* 11/2010 Iwamoto et al. ............... 83/883
2013/0309034 A1* 11/2013 Inagaki et al. ............... 409/132
2014/0093322 A1* 4/2014 Bleicher et al. ............... 409/131

FOREIGN PATENT DOCUMENTS

| JP | 2004-083378 A | | 3/2004 |
|---|---|---|---|
| JP | 2008-007384 A | | 1/2008 |
| JP | 2008007384 A | * | 1/2008 |
| JP | 2012-031018 A | | 2/2012 |

OTHER PUBLICATIONS

Yamane, Masayuki, et. al., "Handbook for Glass Engineering", Jul. 5, 1999, cited in JP Office Action dated Jun. 4, 2013.

JP Office Action dated Jun. 4, 2013, issued in corresponding application No. 2012-556314.

* cited by examiner

| vibration number of processing unit (KHz) | 40 | 42 | 44 | 46 | 48 | 50 | 52 | 54 | 56 | 58 | 59 | 60 |
|---|---|---|---|---|---|---|---|---|---|---|---|---|
| state of processing | × | × | × | × | × | △ | △ | △ | △ | △ | △ | ○ |

| vibration number of processing unit (KHz) | 61 | 62 | 63 | 64 | 65 | 66 | 67 | 68 | 69 | 70 | 72 | 74 |
|---|---|---|---|---|---|---|---|---|---|---|---|---|
| state of processing | ○ | ○ | ○ | ○ | △ | △ | △ | △ | × | × | × | × |

× . tempered glasses were broken
△ . Chipping 100 to 150 μm (processing may be possible, but quality was worse)
○ . Chipping 30 μm or less (both of processing and quality are good)

Fig. 5

| vibration amplitude of processing unit (μm) | 1 | 2 | 3 | 6 | 7 | 8 | 9 | 10 | 11 | 12 |
|---|---|---|---|---|---|---|---|---|---|---|
| state of processing | × | × | ○ | ○ | ○ | ○ | ○ | △ | × | × |

× . tempered glasses were broken
△ . Chipping 100 to 150 μm (prcessing may be possible, but quality was worse)
○ . Chipping 30 μm or less (both of prcessing and quality are good)

Fig. 6

| response speed (m sec) | 10 | 5 | 1 | 0.5 | 0.4 | 0.3 | 0.2 |
|---|---|---|---|---|---|---|---|
| state of processing | × | × | × | △ | △ | ○ | ○ |

× . tempered glasses were broken
△ . Chipping 100 to 150 μm (prcessing may be possible, but quality was worse)
○ . Chipping 30 μm or less (both of prcessing and quality are good)

Fig. 19
magnified photograph of part A (270 times)
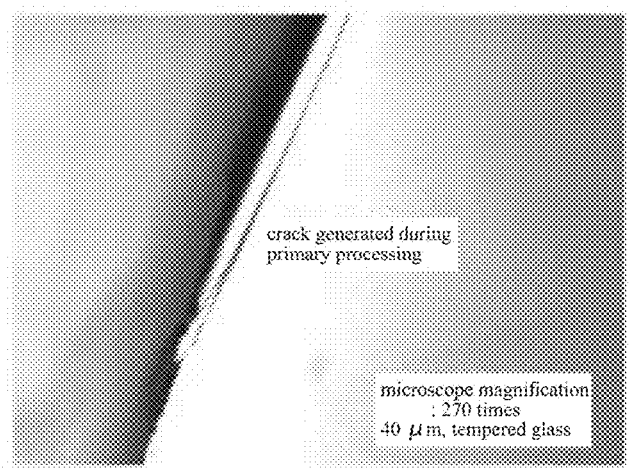
primary processing
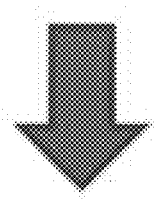
secondary processing
(no processing due to
crack generation)
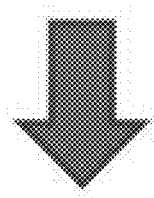
polish processing
(no processing due to
crack generation)

METHOD OF PROCESSING TEMPERED GLASS AND DEVICE OF PROCESSING TEMPERED GLASS

TECHNICAL FIELD

The present invention relates to a method of processing a tempered glass and a device of processing the tempered glass.

BACKGROUND ART

A display device such as a mobile terminal, a tablet, a touch panel and PDA (Personal Digital Assistant) generally employs a tempered glass which is chemically reinforced. The tempered glass configures a glass base material and a surface reinforced layer (chemically reinforced layer) on its top surface. This configuration enables the tempered glass having the thinner thickness while realizing the higher strength against bending stress and impact.

Processing a tempered glass having a surface reinforced layer of a certain thickness or more and a certain surface compression stress or more (for example, the thickness of the surface reinforced layer is 40 μm or more, and the surface compression stress is 600 MPa or more) is not easy. Accordingly, Patent Publication 1 describes a method of processing the tempered glass having the surface reinforced layer of 30 μm or less and the surface compression stress of 600 MPa or less which is processed by employing a known cutting method (such as laser beam machining). Further, Patent Publication 2 proposes a method of processing a tempered glass (the thickness of the surface reinforced layer is 40 μm or more, and the surface compression stress is 600 MPa or more) by removing, at an expected cutting position, a part of the surface reinforced layer that is weakening the processing strength. Then, in this method, an expected cutting trench is formed and cut by using a laser.

PRIOR TECHNICAL PUBLICATIONS

Patent Publications

Patent Publication 1:
Japanese Patent Publication Gazette No.2004-83378
Patent Publication 2:
Japanese Patent Publication Gazette No.2012-31018

SUMMARY OF INVENTION

Problems to be Solved by Invention

However, in Patent Publication 1, only the workability of the tempered glass is attached importance and a further thinning and a further strengthening which are currently required are not satisfied by employing the method of Patent publication 1.

The formation of the expected cutting trench on the surface reinforced layer is essential in Patent publication 2 to increase the number of the steps, and further the processing on the tempered glass is restrictive because the expected cutting trench may be formed only in a linear fashion.

Under these situations, the present inventor has, as a processing method, hitherto paid attention to a processing method in which a processing device is vibrated while under rotation, but which has been recognized as being difficult to apply to the processing of a tempered glass. The present inventor has found the conditions for properly processing the tempered glass in the above method, then reaching the present invention.

The preset invention has been made in consideration of the above matters. A first object thereof is to provide a method of simply and properly processing a tempered glass which has the increased strength by a surface reinforced layer while a degree of freedom of the processing is secured under the situation that a processing device is vibrated and rotated.

A second object thereof is to provide a processing apparatus for a tempered glass which employs the above method of processing the tempered glass.

Means of Solving Problems

An aspect of the present invention for achieving the first object has the configuration of a method of processing a tempered glass having a surface reinforced layer by means of a processing device which is vibrated under the rotation thereof, the method comprising the steps of:

controlling vibration of the processing device in a feedback fashion such that a vibration amplitude and a vibration frequency of the processing device approach a target vibration amplitude and a target vibration frequency, together with setting the target vibration amplitude and the target vibration frequency so as to not keep them in a range of values at which the quality of the tempered glass worsens, the range of values changing along a thickness of the tempered glass during the processing of the tempered glass; and employing a sample cycle of 0.3 msec or less in the feedback control.

As another aspect, the target vibration amplitude is set in a range from 3 μm to 9 μm and the target vibration frequency is set in a range from 60 kHz to 64 kHz. Preferably, the number of rotation of the processing device is set in a range from 2000 rpm to 30000 rpm. As still another aspect, the tempered glass having the surface reinforced layer includes a group of stacked glasses composed of a plurality of the stacked tempered glasses.

An aspect of the present invention for achieving the second object has the configuration of an apparatus of processing a tempered glass having a surface reinforced layer by means of a processing device which is vibrated under the rotation thereof, the apparatus comprising:

a vibration mechanism vibrating the processing device to the tempered glass;

a vibration adjusting means adjusting the vibration mechanism; and a control means by which, by controlling the vibration adjusting means, vibration of the processing device to the tempered glass is controlled in a feedback fashion such that a vibration amplitude and a vibration frequency of the processing device approach to a target vibration amplitude and a target vibration frequency, the target vibration amplitude and the target vibration frequency are not kept in a range where a value of worsening the quality of the tempered glass is generated, the value changing along thickness of the tempered glass during the processing of the tempered glass, and the feedback control is implemented every sample cycle of 0.3 msec or less.

As another aspect, the target vibration amplitude is set in a range from 3 μm to 9 μm and the target vibration frequency is set in a range from 60 kHz to 64 kHz in the control means. As still another aspect, the number of rotation of the processing device in the control means is set in a range from 2000 mm to 30000 rpm.

Effects of Invention

In accordance with another aspect of the present invention, the non-restrictive processing can be performed without suffering from the restriction of the processing pathway even to the tempered glass having the surface reinforced layer with the higher strength (specifically, the thickness of the surface reinforced layer is 40 μm or more, and the surface compression stress is 600 MPa or more) because the ultrasonic vibration processing is conducted while the processing device is vibrated under the rotation thereof.

On the other hand, the vibration amplitude and the vibration frequency of the processing device are allowed to be out of the range of values at which the quality of the tempered glass worsens during the vibration of the processing device, because the vibration by the processing device is conducted such that the vibration amplitude and the vibration frequency of the processing device are controlled to approach the target vibration amplitude and the target vibration frequency in the feedback fashion, and that the target vibration amplitude and the target vibration frequency are set so as to not keep them in the range of values at which the quality of the tempered glass worsens. Further, since the feedback control is implemented by the sample cycle of 0.3 msec or less, the readjustment can be conducted in quite a rapid timing. Even if the vibration amplitude and the vibration frequency of the processing device would fall into the range of values at which the quality of the tempered glass worsens, these values in the range can be returned to the target vibration amplitude and the target vibration frequency (out of the range of values at which the quality of the tempered glass worsens) within the above quite the rapid timing. Accordingly, if slight condition changes, such as release of a tensile stress inside of the tempered glass, would take place during the processing of the tempered glass, the glass can follow such the change, thereby appropriately preventing the generations of cracks and chippings in the tempered glass over a specified degree. As a result, the tempered glass can be processed simply and reliably.

Accordingly, even the tempered glass of which strength is increased by incorporating the surface reinforced layer can be processed simply and reliably while the degree of freedom of the processing is secured.

The employment over 0.3 msec as the sample cycle in the feedback control increases the possibility of the reduction of processing accuracy of the tempered glass (generations of cracks and the chippings in the tempered glass over the specified degree) because, based on the knowledge the present inventor has obtained, the glass cannot follow the stress change in the tempered glass. Accordingly, the sample cycle exceeds 0.3 msec is used.

In accordance with another aspect of the invention, the preferable vibration amplitude and vibration frequency can be provided in view of the processing accuracy of the tempered glass based on the knowledge the present inventor has obtained because the target vibration amplitude is set in the range from 3 μm to 9 μm and the target vibration frequency is set in the range from 60 kHz to 64 kHz.

The reasons why the target vibration amplitude is set in the range from 3 μm to 9 μm is that the cracks and the chippings over a specified degree are generated due to the insufficient processing ability (due to the increase of the cutting resistance occurring by the remaining of the cutting scrap) under 3 μm and that the possibility of generating the cracks and the chippings over a specified degree in the tempered glass is increased because the tempered glass cannot follow the stress change generated therein during the processing over 9 μm.

In accordance with the invention of Claim 3, the preferable number of rotation of the processing device can be obtained in view of processing the tempered glass having the surface reinforced layer with the higher strength under the above-mentioned vibration conditions based on the knowledge the present inventor has obtained because the number of rotation of the processing device is set in the range from 2000 rpm to 30000 rpm.

The reasons why the number of rotation of the processing device is set in the range from 2000 rpm to 30000 rpm is that the processing effect to the tempered glass is insufficient under 2000 rpm and that the processing effect is reduced by the occurrence of a slip phenomenon (reduction of processing resistance) on the processed surface over 30000 rpm, thereby generating the problem of durability.

In accordance with another aspect of the invention, a plurality of the stacked glasses can be obtained at the same time to elevate the production efficiency by cutting the group of the stacked glasses because the tempered glass having the surface reinforced layer includes the above group of the stacked glasses prepared by stacking a plurality of the tempered glasses.

An aspect of the invention includes an apparatus of processing a tempered glass having a surface reinforced layer by means of a processing device which is vibrated under the rotation thereof, the apparatus comprising: a vibration mechanism vibrating the processing device; a vibration adjusting means adjusting the vibration mechanism; and a control means by which, by controlling the vibration adjusting means, vibration of the processing device is controlled in a feedback fashion such that a vibration amplitude and a vibration frequency of the processing device approach a target vibration amplitude and a target vibration frequency, the target vibration amplitude and the target vibration frequency are not kept in a range of values at which the quality of the tempered glass worsens, the range of values changing along a thickness of the tempered glass during the processing of the tempered glass, and the feedback control is implemented every sample cycle of 0.3 msec or less. In accordance with this invention, the non-restrictive processing can be performed without suffering from the restriction of the processing pathway even to the tempered glass having the surface reinforced layer (specifically, the thickness of the surface reinforced layer is 40 μm or more, and the surface compression stress is 600 MPa or more) by conducting the ultrasonic vibration processing in which the processing device is vibrated under the rotation thereof.

In accordance with another aspect of the invention, the apparatus of processing the tempered glass, which may employ the method of processing the tempered glass comprising the steps of controlling vibration of the processing device in a feedback fashion such that a vibration amplitude and a vibration frequency of the processing device approach a target vibration amplitude and a target vibration frequency, together with setting the target vibration amplitude and the target vibration frequency so as to not keep them in a range of values at which the quality of the tempered glass worsens, the range of values changing along a thickness of the tempered glass during the processing of the tempered glass; and employing a sample cycle of 0.3 msec or less in the feedback control, can be provided because the target vibration amplitude is set in the range from 3 μm to 9 μm and the target vibration frequency is set in the range from 60 kHz to 64 kHz in the control means.

In accordance with another aspect of the invention, the apparatus of processing the tempered glass, which may employ the method of processing the tempered glass comprising the steps of controlling vibration of the processing device in a feedback fashion such that a vibration amplitude and a vibration frequency of the processing device approach a target vibration amplitude and a target vibration frequency, together with setting the target vibration amplitude and the target vibration frequency so as to not keep them in a range of values at which the quality of the tempered glass worsens, the range of values changing along a thickness of the tempered glass during the processing of the tempered glass; and employing a sample cycle of 0.3 msec or less in the feedback control, can be provided because the number of rotation of the processing device is set in the range from 2000 rpm to 30000 rpm in the control means.

BRIEF DESCRIPTION OF DRAWINGS

[FIG. 5] Table showing the experiment results (the experiment results of Processing Experiment 2) wherein the target vibration amplitudes of the processing device were changed while the conditions were fixed such that the target vibration frequency of the processing device was 63 kHz and the sample cycle (response speed) of the feedback was 0.2 msec.

[FIG. 6] Table showing the experiment results (the experiment results of Processing Experiment 3) wherein the sample cycles (response speeds) of the feedback were changed while the conditions were fixed such that the target vibration amplitude of the processing device was 8 μm and the target vibration frequency of the processing device was 63 kHz.

[FIG. 19] Magnified photograph showing the part of the protection glass for the portable terminal of Comparative Example which corresponds to the part A of FIG. 13 (magnification: 270 times).

EMBODIMENTS FOR IMPLEMENTING INVENTION

Embodiments of the present invention will be hereinafter described referring to the annexed drawings.

1. Firstly, before the description of the method of processing the tempered glass, the tempered glass which is the subject of the method of processing and the apparatus of the ultrasonic vibration processing acting as the apparatus for processing the tempered glass employing the above processing method will be described.

(1) Tempered Glass

Figure 1:
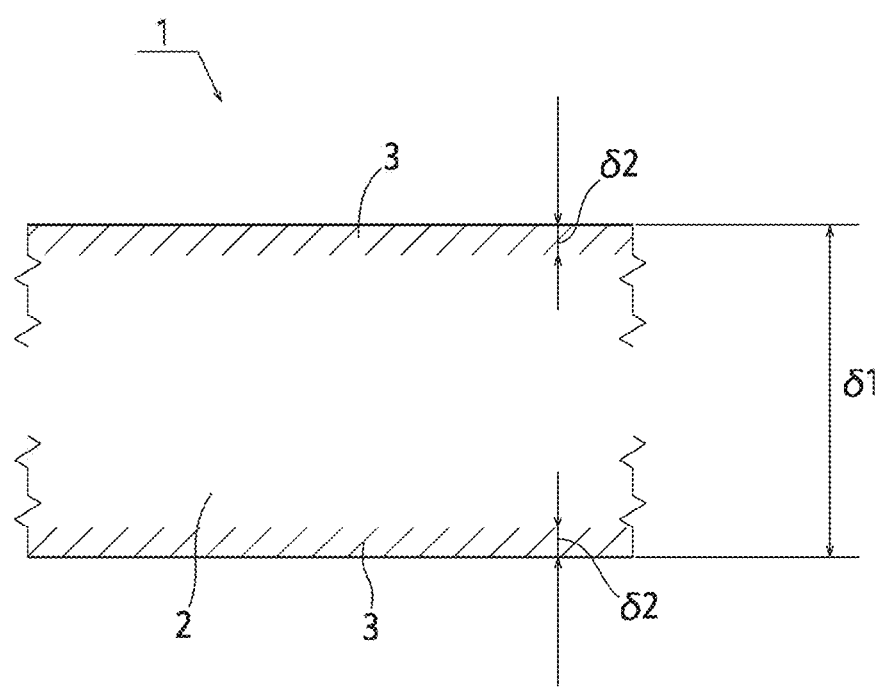
[FIG. 1] An explanatory drawing showing the tempered glass having the surface reinforced layer.

As shown in FIG. 1 the tempered glass 1 has the configuration including a glass mother material 2 (for example, alumino-silicate glass) and a surface reinforced layer (chemically reinforced layer) 3 placed on its top surface side (bottom surface side). The surface reinforced layer 3 enables the thinning of the tempered glass 1 and secures the high strength against the impact. The specific tempered glass 1 to be processed has the thickness (δ 1) of the mother material 2 of about 0.7 mm, the thickness (δ 2) of the surface reinforced layer 3 of 40 μm or more (the surface reinforced layer having the thickness of 70 μm is currently developed which is, of course, a subject of the processing), and a surface compression stress from 600 MPa to 700 MPa. Of course, the ordinary glass in addition to the tempered glass is a subject of the processing by the ultrasonic vibration processing apparatus.

Figure 2:
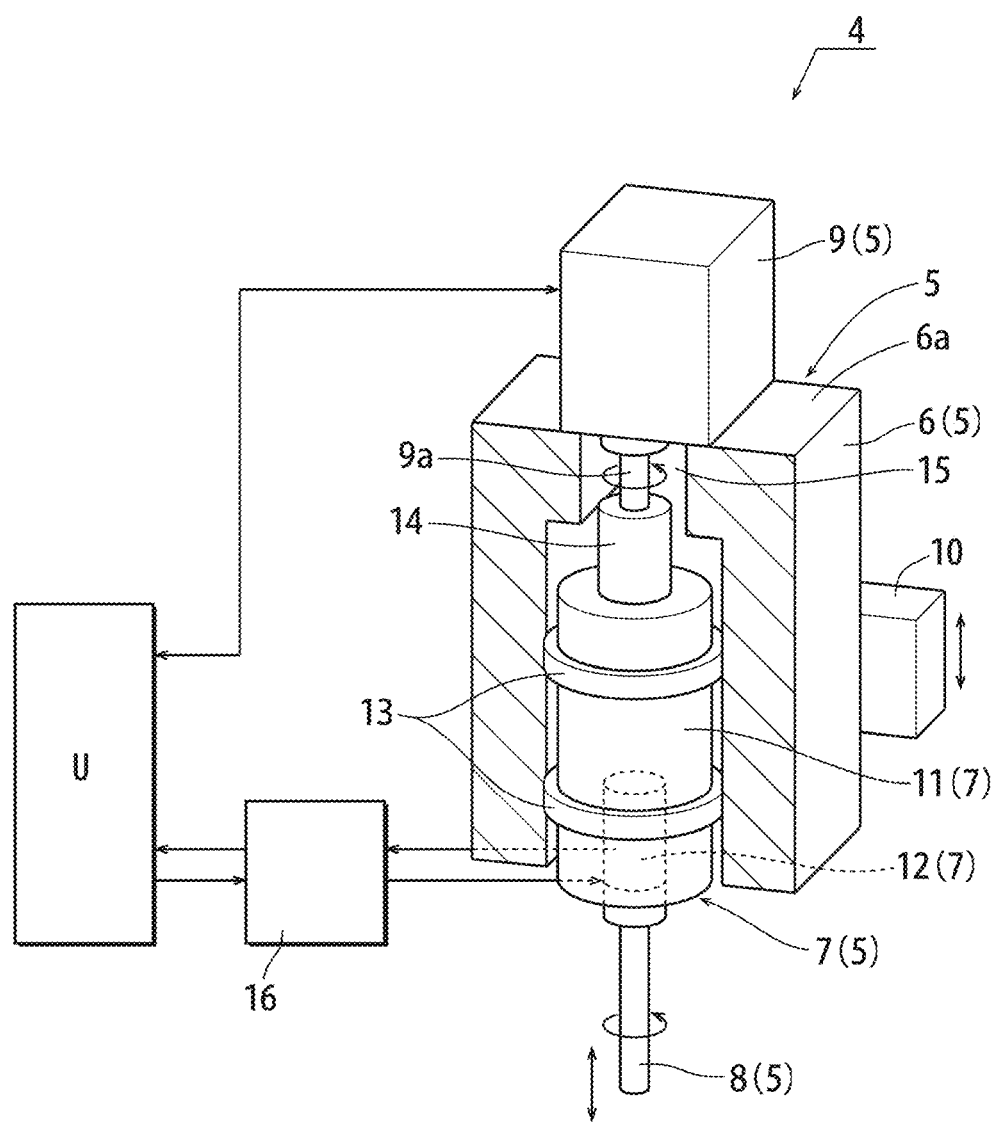
[FIG. 2] An entire drawing showing the ultrasonic vibration processing apparatus in accordance with the Embodiment.

(2) Ultrasonic Vibration Processing Apparatus (i) As shown in FIG. 2, the ultrasonic vibration processing apparatus 4 includes a processing apparatus main body 5.

As shown in FIG. 2, the processing apparatus main body 5 includes a relatively long and cylindrical housing 6 with a closed end, a vibration apparatus (vibration mechanism) 7 mounted in the housing 6, a processing device 8 attached to the vibration apparatus 7, and a motor 9 for rotating and driving the vibration apparatus 7.

(a) The housing is mounted to an elevating apparatus (only part of which (an attaching part to the housing) is shown in FIG. 2) 10. The elevating apparatus 10 has functions of not only raising and lowering the housing 6 along the vertical direction but also adjusting the elevating speed (refer to an arrow). The housing is lowered at a specified setting speed (feed speed) during the processing.

(b) The vibration apparatus 7 includes a columnar body 11, and a columnar unit 12 for generating ultrasonic vibrations. The body 11 is positioned, with its axial center oriented along the vertical direction, on the inner circumferential surface of the housing via bearings 13. The bearings 13 enable the body 11 to rotate around its axial center and disable the body 11 to move along the direction the axial center extends (vertical direction). A circular cylinder 14 for mounting a driving axis 9a of the motor 9 is formed at the top end of the body 11, and a holding aperture (not shown) is formed at the bottom end surface of the body 11. The unit 12 for generating ultrasonic vibrations is fixed to the holding aperture at the bottom surface of the body. As known in the art, the unit 12 is configured with an ultrasonic vibrator, a vibration transmitting section and an amplification section connected in series, and these ultrasonic vibrator, vibration transmitting section and amplification section are disposed in this turn from the inside of the holding aperture of the body 11 toward the open side. The ultrasonic vibrator among these has piezoelectric elements and metal blocks for fastening these with bolts, and electrodes are positioned between the piezoelectric elements and between the piezoelectric element and the metal block. The application of a direct pulse voltage between the electrodes excites the piezoelectric elements to generate the vertical vibrations. The ultrasonic vibrator generates the strong ultrasonic vibrations by means of a resonance phenomenon when the frequency of the direct pulse voltage to be applied is set to be equal to the resonance frequency of the ultrasonic vibrator. The vibration transmitting section has a function of transmitting the vibrations of the ultrasonic vibrator to the amplification section, and the amplification section has a function of amplifying the vibrations transmitted from the vibration transmitting section.

(c) As shown in FIG. 2, the processing device 8 is connected to the amplification section of the unit 12 at the axial center thereof in order to be vibrated by the vibrations of the unit 12. The processing unit 8 processes the tempered glass under the direct contact therewith and is made of a diamond grind stone in the form of axis, and extends downward from the unit 12. The processing device 8 has functions of not only processing the tempered glass and of but also acting as a sensor for detecting the pressure change of the tempered glass.

(d) The motor 9 is mounted to an outer surface (top end surface) of the bottom part 6a of the housing 6. A penetration aperture 15 is formed through the bottom part 6a of the housing 6, which communicates the outside and the inside of the housing, and the driving axis 9a of the motor 9 penetrates the penetration aperture 15 and is engaged and held (fixed) to the circular cylinder 14 of the body 11. Thereby, the driving force of the motor 9 is transmitted through the body 11 and the unit 12 to the processing unit 8 where the processing unit 8 can rotate around the axial center.

Figures 3, 4:
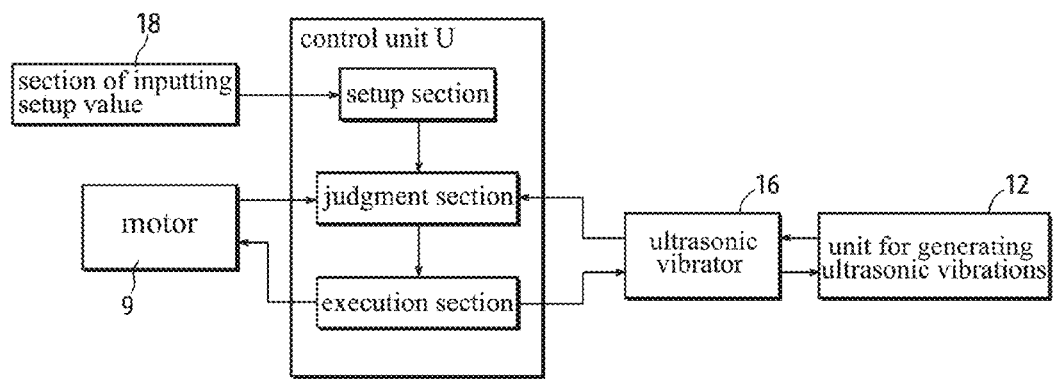
[FIG. 3] A diagram showing the controlling relation of the ultrasonic vibration processing apparatus in accordance with the Embodiment.
[FIG. 4] Tables showing the experiment results (the experiment results of Processing Experiment 1) wherein the target vibration frequencies of the processing device were changed while the conditions were fixed such that the target vibration amplitude of the processing device was 8 μm and the sample cycle (response speed) of the feedback was 0.2 msec.

(ii) As shown in FIG. 2 and FIG. 3, the ultrasonic vibration processing apparatus 4 includes an ultrasonic oscillator (vibration adjusting means) 16 adjusting the vibration amplitude and the vibration frequency of the unit 12.

The ultrasonic oscillator 16 adjusts an input electric signal (specifically, voltage or current), and the adjusted electric signal is then supplied to the unit 12 (ultrasonic vibrator). In this Embodiment, the amplitude and the frequency of an input voltage from a power source are adjusted while the value of current is not changed (for example, a specified value from 1 to 2 A), and the adjusted voltage signal (for example, 300 to 400 V) is supplied to the unit 12 (ultrasonic vibrator). Of course, in this case, a current signal may be supplied to the ultrasonic vibrator under the constant voltage instead of the voltage signal.

(ii) As shown in FIG. 2 and FIG. 3, the ultrasonic vibration processing apparatus 4 includes a control unit U which controls the ultrasonic oscillator 16 (unit 12 for generating ultrasonic vibrations).

(a) The voltage signal (amplitude and frequency signals of the voltage) from the ultrasonic oscillator 16, and the rotation number signal of the motor 9 (voltage) are input to the control unit U, and control signals for the ultrasonic oscillator 16 and the motor 9 are output from the control unit U.

(b) The control unit U includes a setup section (setup means) which setups a target value for a feedback control, a judgment section (judgment means) which judges an operation variable based on the deviation between the target value of the setup section and the control variable, and an execution section (execution means) which outputs the control signal for performing the operation variable coming from the judgment section.

The target vibration amplitude and the target vibration frequency with respect to the input voltage to the unit 12 for generating ultrasonic vibrations (ultrasonic vibrator) as the target values for the feedback control are established in the setup section, and these values change along a thickness of the tempered glass during the processing of the tempered glass, and do not belong to the range of values at which the quality of the tempered glass worsens (values of generating cracks and the chippings in the tempered glass over the specified degree). This is because the stress change in the tempered glass during the processing, such as release of a tensile stress inside of the tempered glass, must be considered. The target current is setup with respect to the input current to the motor 9 in view of realizing the effective rotation for the processing.

The target vibration amplitude of the input voltage with respect to the unit 12 for generating ultrasonic vibrations is set up such that the vibration amplitude of the processing device 8 finally falls into a range (which does not fall into a range of values at which the quality of the tempered glass worsens) of 3 µm to 9 µm (preferably 8 µm). The values under 3 µm and over 9 µm are recognized to fall in the range of values at which the quality of the tempered glass worsens. The reasons why the target vibration amplitude is, based on the knowledge the present inventor has obtained, set in the range from 3 µm to 9 µm is that the cracks and the chippings over a specified degree are generated due to the insufficient processing ability (due to the increase of the cutting resistance occurring by the remaining of the cutting scrap) under 3 µm and that the possibility of generating the cracks and the chippings over a specified degree in the tempered glass is increased because the tempered glass cannot follow the stress change generated therein during the processing over 9 µm.

The target vibration frequency of the input voltage with respect to the unit 12 for generating ultrasonic vibrations (ultrasonic vibrator) is setup such that the vibration frequency of the processing device 8 finally falls into a range (which does not fall into a range of values at which the quality of the tempered glass worsens) of 60 kHz to 64 kHz (preferably 63 kHz). The values under 60 kHz and over 64 kHz are recognized to fall in the range of values at which the quality of the tempered glass worsens. The reasons why the target vibration frequency is, based on the knowledge the present inventor has obtained, set in the range from 60 kHz to 64 kHz is that the cracks and the chippings over specified degrees are generated due to the insufficient processing ability under 60 kHz and that the possibility of generating the cracks and the chippings over specified degrees in the tempered glass is increased because the tempered glass cannot follow the stress change generated therein during the processing over 64 kHz.

The target current with respect to the motor 9 is established such that the rotation number of the processing device 8 falls in a specified rotation number from 2000 rpm to 30000 rpm (preferably 5000 rpm). The reasons why the rotation number of the processing device is set in the range from 2000 rpm to 30000 rpm are that the processing effect to the tempered glass is insufficient under 2000 rpm and that the processing effect is reduced by the occurrence of a slip phenomenon (reduction of processing resistance) on the processed surface over 30000 rpm, thereby generating the problem of durability.

In FIG. 3, a numeral 18 denotes a section of inputting a setup value into the setup section.

The judgment section judges, with respect to the vibration amplitude of the processing unit 8, the operation variable based on the deviation between the amplitude of the voltage (return voltage) from the ultrasonic oscillator 16 and the target amplitude of the setup section, and judges, with respect of the vibration number of the processing device 8, the operation variable based on the deviation between the frequency of the voltage (return voltage) from the ultrasonic oscillator 16 and the target frequency of the setup section. With respect to the rotation number of the processing device 8, the operation variable is judged based on the deviation between the current signal from the motor 9 and the target current of the setup section.

The execution section outputs, as the control signals, the respective operation variables from the judgment section to the ultrasonic oscillator 16 and the motor 9. Thereby, the output voltage (amplitude, frequency) from the ultrasonic oscillator 16 is adjusted so that the processing device 8 is controlled in the feedback fashion to take a specified vertical amplitude and a specified frequency. Also, the rotation number of the motor 9 is controlled in the feedback fashion to keep the rotation number of the processing device at a specified rotation number.

The control unit is set to perform the feedback control at the sample cycle (response speed) range of 0.3 msec or less or from 0.3 msec to 0.2 msec (preferably 0.2 msec). The reasons why the sample cycle is set in the range of 0.3 msec to 0.2 msec is that the possibility of generating the cracks and the chipping in the tempered glass over the specified degree increases because the glass cannot follow the slight stress change therein over 0.3 msec, based on the knowledge the present inventor has obtained. The lower limit of 0.2 msec is the lowermost limit currently available, and the feedback control cannot be conducted below the above lower limit sample cycle. If a tempered glass having a sample cycle below 0.3 msec will be developed, the use thereof is more preferable.

The speed-up of the analogue/digital conversion function and the arithmetic processing ability of CPU in the control unit U is intended compared to an existing control unit for the speed-up of the sample cycle of the feedback control. Thereby, when the sample cycle is set to be 0.2 msec and the vibration number (frequency) of the processing device 8 is set to be 80 kHz specifically, the number of the vibration impact supplied to the tempered glass before the vibration starts responding to the load change under the optimum conditions can be suppressed to 16 times. When the vibration conditions are made optimum at the sample cycle of 0.2 msec under the feed speed of the processing device 8 of 30 mm/min., the processing proceeds with the feedback control taking place every 0.1 μm so that the slight condition change (stress change) during the processing can be responded (followed).

On the other hand, when the vibration number (frequency) of the processing device 8 is 80 kHz, the vibration impact is supplied to the tempered glass once in every 0.0000125 second (0.0125 ms). When the sample cycle (vibration response speed) is 10 msec under the same vibration number (under the case of existing control unit), 800 times of the vibration impacts are supplied to the tempered glass before the vibration starts responding to the load change under the optimum conditions. When the vibration conditions are optimized at the sample cycle of 10 msec under the feed speed of the processing device 8 of 30 mm/min, the processing proceeds every 5 μm. This 5 μm is relatively larger with respect to the surface reinforced layer of several tens μm, and the condition changes of the tempered glass cannot be followed. As its result, the processing must be performed while the stress is given to the tempered glass, and the cracks are generated on the tempered glass.

(iv) Target values of control

The target values of the above control will be backed up in the Processing Experiments 1 to 3 below which have been conducted by the present inventor. The Processing Experiments 1 to 3 were conducted to the tempered glass under the following common experiment conditions, and their evaluations were performed based on the following evaluation standards.

(a) Common Experiment Conditions
Tempered glass to be processed
  Material of mother material: alumino-silicate glass
  Thickness of mother material ($\delta 1$) : 0.70 mm
  Thickness of surface reinforced layer ($\delta 2$) : 40 μm (0.04 mm)
  Compressive residual stress: 600 MPa to 700 MPa
Processing device 8
  Feed speed for processing: 60 mm/min.
  Number of rotations: 5000 rpm
  Diameter of axial processing device: i.5 mm
  Grain size of processing device 8: #600

(b) Common Evaluation Standard
  x: Tempered glass was broken.
  Δ: Chipping 100 to 150 μm (processing might be possible, but quality was worse)
  ○: Chipping 30 μm or less (both of processing and quality were good)

(c) Processing Experiment 1
(c-1) An experiment was conducted in which a target number of vibration (target frequency) was changed under the fixed conditions below by adjusting voltages for obtaining excellent number of vibrations of a processing device 8 with respect to one piece of tempered glass.
  Target vibration amplitude of processing device: 8 μm
  Sample cycle (response speed) of feedback: 0.2 msec
(c-2) The results shown in Fig.4 were obtained by Processing Experiment 1. In accordance with the results of Fig.4, it was found out that the target number of vibration of the processing device 8 was preferably from 60 kHz to 64 kHz (especially 64 kHz) (the range of values at which the quality of the tempered glass would worsen is under 60 kHz and over 64 kHz).

(d) Processing Experiment 2
(d-1) An experiment was conducted in which a target vibration amplitude of a processing device 8 was changed under the fixed conditions below by adjusting voltages for obtaining excellent target vibration number of the processing device 8 with respect to one piece of tempered glass.
  Target frequency of processing device: 63 kHz
  Sample cycle (response speed) of feedback: 0.2 msec
(d-2) The results shown in Fig.5 were obtained by Processing Experiment 2. In accordance with the results of Fig.5, it was found out that vibration amplitude of the processing device 8 was preferably from 3 μm to 9 μm (especially 8 μm)

(the range of values at which the quality of the tempered glass would worsen is under 3 µm and over 9 µm).

(e) Processing Experiment 3

(e-1) An experiment was conducted in which a sample cycle (response speed) of feedback was changed under the fixed conditions below because the sample cycle of the feedback of the processing was important for the tempered glass in which a slight condition change occurred during the processing.

Figure 7:
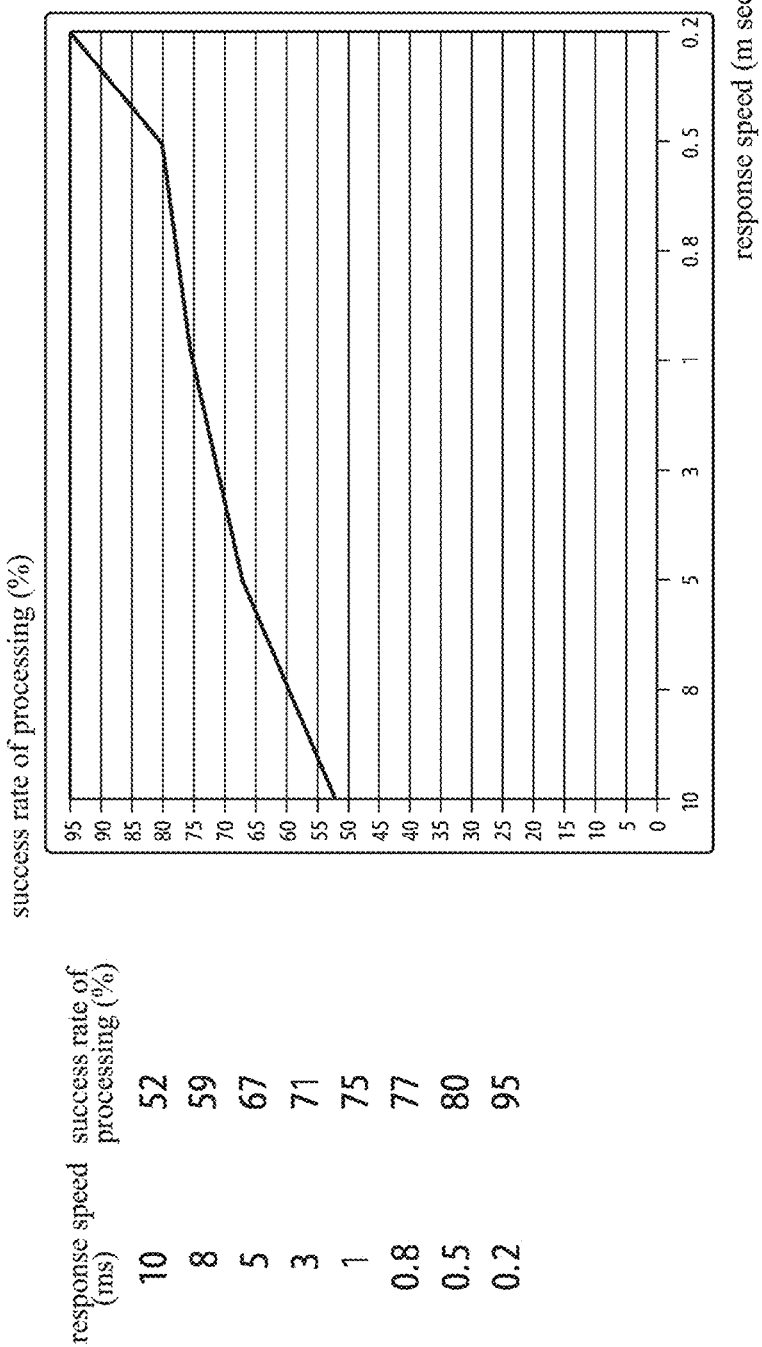
[FIG. 7] Graph showing the relation between the sample cycle (response speed) of the feedback and the success rate of the processing.

Target vibration amplitude of processing device: 8 µm
Target vibration frequency of processing device: 63 kHz (e-2) The results shown in FIG. 6 were obtained by Processing Experiment 1. In accordance with the results of FIG. 6, it was found out that the sample cycle of the feedback was preferably under 0.3 msec (especially 0.2 msec). The lower limit (0.2 nsec) is a limit value currently available (e3) FIG. 7 shows the relation between the sample cycles (response speeds) of feedback control and the success rates of the processing. In accordance with FIG. 7, it was found out that the success rate increased with the decrease of the response speed, and the success rate increased with the significant rise especially below 0.5 msec. The evaluation of processing success was the same as the above-mentioned (◯). In FIG. 6, the results with the success rate of 87% or more are evaluated as "◯".

Then, an example of the method of processing the tempered glass in accordance with Embodiment will be described together with the control of the above control unit U.

Figure 8:
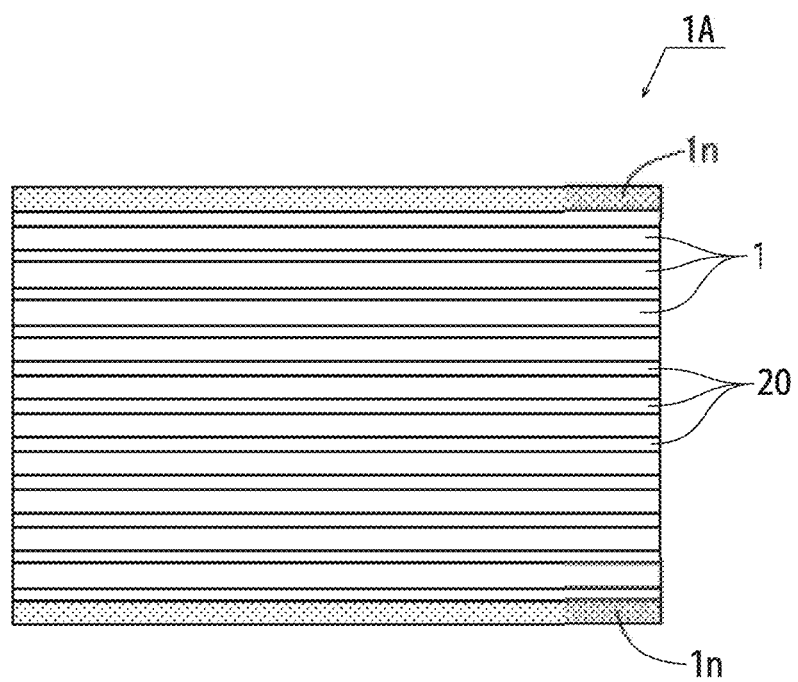
[FIG. 8] Illustration showing the stack of the tempered glasses to be processed.

(1) At first, as shown in FIG. 8, the tempered glass 1 (thickness of mother material was 0.7 mm, thickness of surface reinforced layer was 40 µm or more, and surface compression stress was 600 MPa or more) having the surface reinforced layer 3 in the shape of a larger plate is provided. The larger plated-tempered glass is cut out for preparing a plurality of pieces having a certain shape which is used for protection glass of portable terminals and tablets. In the present Embodiment, a stack (a group of stacked glasses) 1A which is prepared by joining a plurality (for example, 12 sheets) of larger plates (tempered glass 1) stacked together by using an adhesive 20 (adhesive layer is 80 µm to 100 µm) is provided for elevating the production efficiency. The adhesive 20 preferably includes a UV cure adhesive which is cured with ultraviolet rays and soluble in warm water because the adhesive is required to be rapidly cured and thereafter to be peeled off from the cut-out respective pieces of the tempered glass. The glass 1n forming the outermost surface (top surface, bottom surface) of the stack 1A may be inexpensive ordinary glass instead of the tempered glass because chipping likely occurs in the outermost surface of the stack 1A. Another stack 1A prepared by joining 16 sheets of larger plates (tempered glass 1) of which a mother material thickness is 0.5 mm may be also employed.

Figure 9:
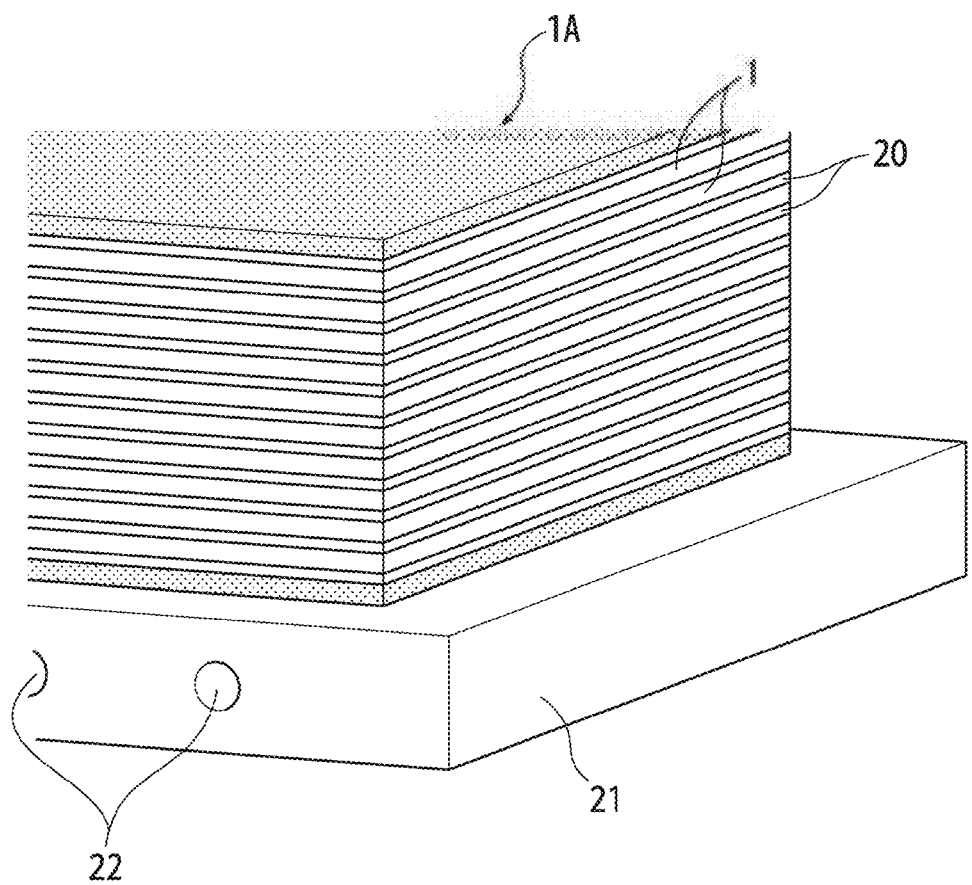
[FIG. 9] Illustration showing the situation where the stack of the tempered glasses is placed on the fixing base.

(2) As shown in FIG. 9, the above stack 1 A is then placed on a thick fixing base 21. A plurality of trenches (not shown) are formed on a top surface of the fixing base 21, and a plurality of communication apertures 22 which are communicated to the respective trenches through the inside of the fixing base 21 are open to a side surface of the fixing base 21. A suction device (not shown) is connected to the respective communication apertures 22, and air above the fixing base 21 is sucked through the trenches on the top surface of the fixed base 21 and the communication apertures 22. Thereby, the stack 1A placed on the fixing base 21 is fixed on the fixing base 21 by means of the sucking action.

Figure 10:
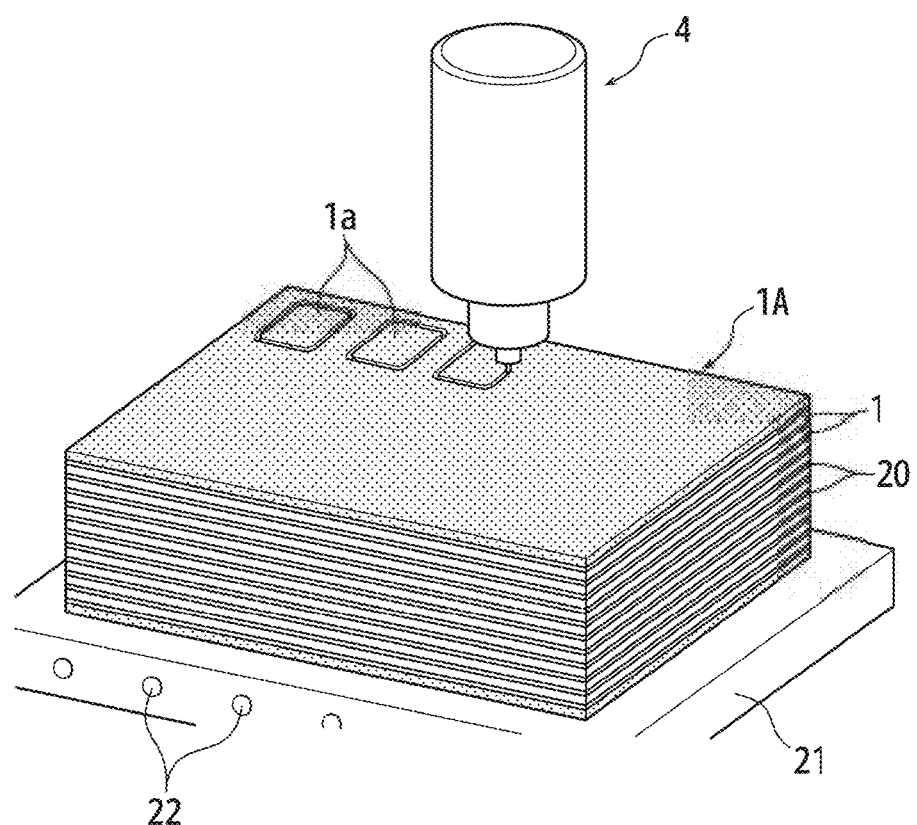
[FIG. 10] Illustration showing the situation where the stack of the tempered glasses is cut out.
Figure 11:
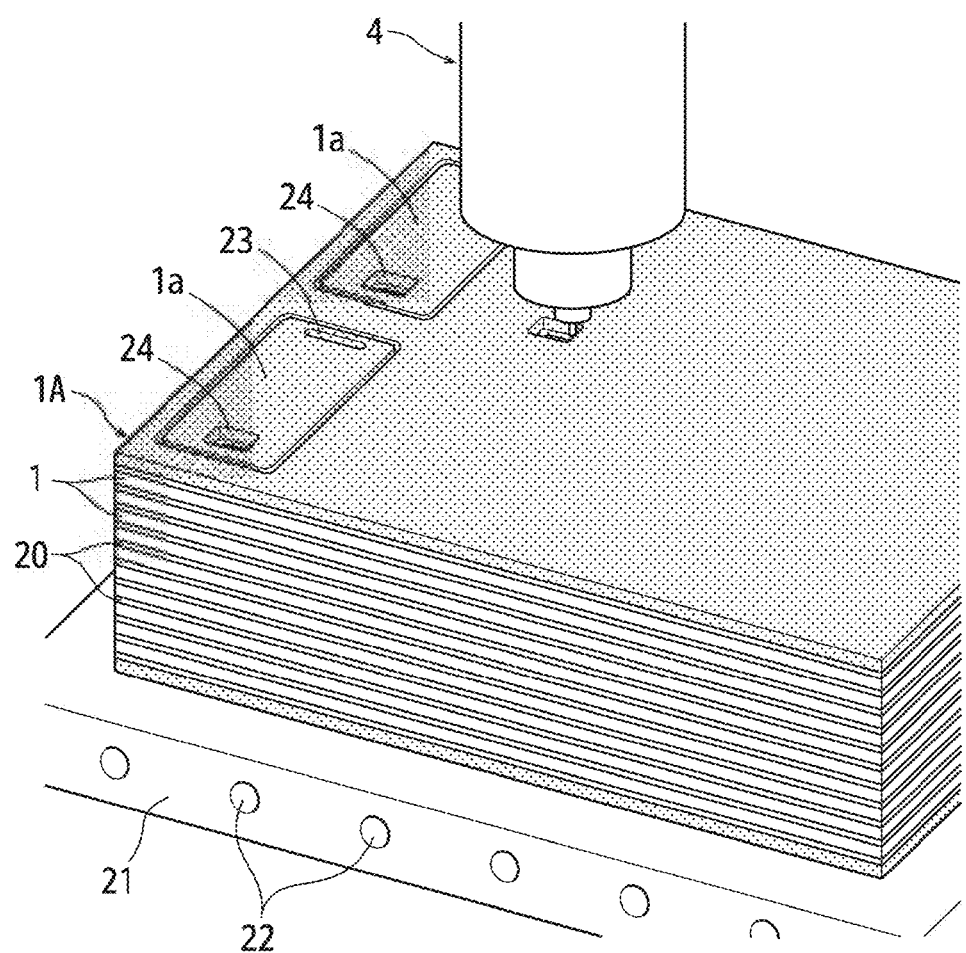
[FIG. 11] Illustration showing the formation of long apertures and square apertures in the stacked block.
Figure 12:
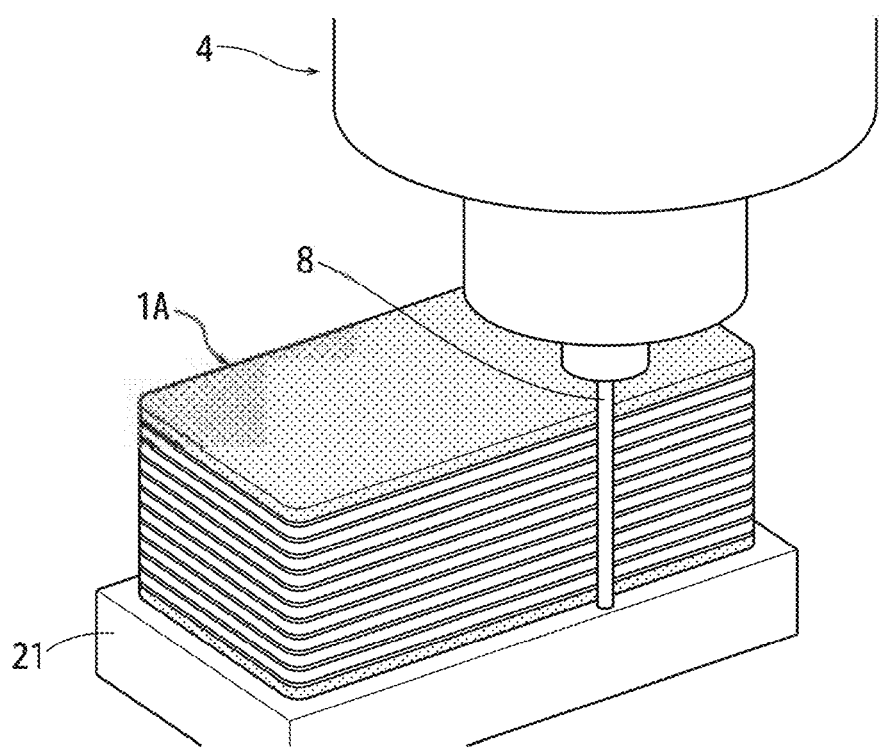
[FIG. 12] Illustration showing the polish processing to the circumferential surface of the stacked block.

(3) As shown in FIG. 10, grind processing is performed, by employing the above-mentioned ultrasonic vibration processing apparatus 4, for cutting out a plurality of pieces (stacked layer block 1a) having a size for protection glass of portable terminals and for forming long apertures 23 and square apertures 24 in the respective stacked layer blocks 1a as shown in FIG. 11. After the cut-out of the stacked layer blocks 1a from the stack 1A, which removes all except for the stacked layer blocks 1a from the stack 1A, polish processing for finishing is performed to the periphery of the respective stacked layer blocks 1a, the long apertures 23 and the square apertures 24. The respective stacked layer blocks 1a remain fixed on the fixing base 21 based on the sucking action. In FIG. 12, as a matter of convenience, the fixing base 21 is scaled down, and the long apertures 23 and the square apertures 24 formed in the stacked layer block 1a are not shown.

The feedback control is conduced in the polish processing and the grind polishing of the stacked layer block which employs the ultrasonic vibration processing apparatus 4 for bringing the vibration amplitude and the number of vibrations close to the target vibration amplitude and the target number of vibrations, respectively. In order to basically prevent the occurrence of the cracks and the chippings of the tempered glass even if the stress is slightly changed in the tempered glass during the processing, the target vibration amplitude and the target number of vibrations are used which are outside of the range of values at which the quality of the tempered glass worsens (standard of generating cracks and chipping in the tempered glass over specified degrees), the range of values changing along the thickness direction of the tempered glass during the processing.

Specifically, the target vibration amplitude of the processing device 8 is set in the preferable range from 3 µm to 9 µm, for example, 8 µm, and the target number of vibrations of the processing device 8 is set in the preferable range from 60 kHz to 64 kHz, for example, 63 kHz. The reasons why the target vibration amplitude of the processing device 8 is set in the range from 3 µm to 9 µm, and why the target vibration frequency is set in the range from 60 kHz to 64 kHz are mentioned above. The sample cycle of 0.2 msec which is below 0.3 msec is used in the feedback control in this case for properly preventing the generation of the cracks in the tempered glass by rapidly grasping the stress change occurring in the tempered glass and by reducing the stress to the tempered glass.

In this case, the processing device 8 is rotated under the number of rotations of 5000 rpm which belongs to a range from 2000 rpm to 30000 rpm for obtaining preferable effects of the rotation together with sufficiently producing the effects of the ultrasonic vibration processing. The other processing conditions are those ordinarily employed.

Then, after the polish processing, the stacked layer block 1a is subjected to the chemical treatment for strengthening the glass end surface by using hydrofluoric acid. Then, the block 1a is dipped into warm water, and the respective tempered glasses 1 are peeled off. Thereby, the processed tempered glass can be obtained as a final product (such as protection glass for portable terminal).

EXAMPLES

3. The quality of the test glass prepared by employing the present method (above processing apparatus) and the quality of another test glass of Comparative Example prepared by employing the prior art method were compared with each other and evaluated.

Figure 13:
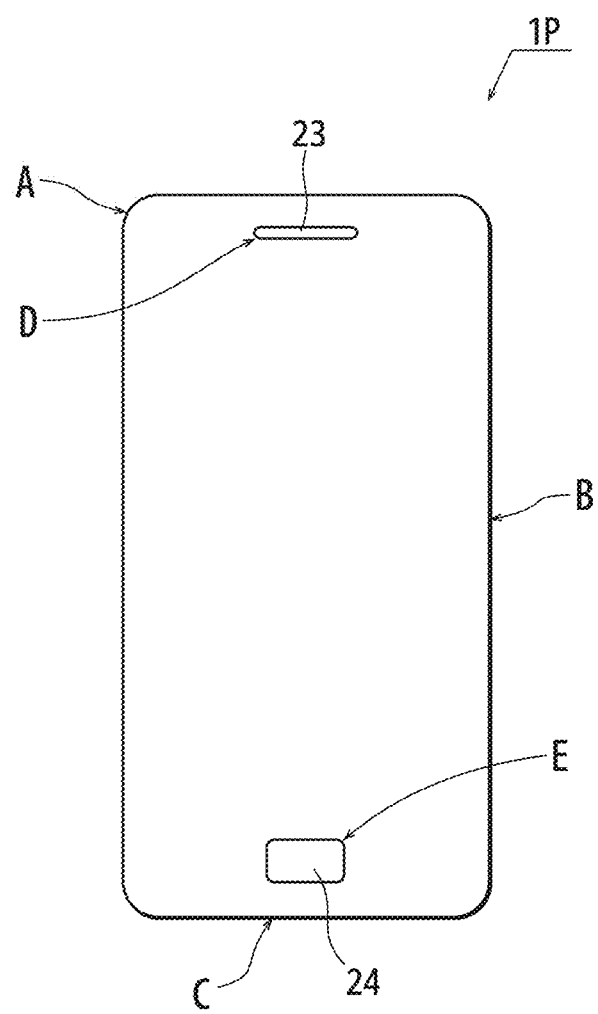
[FIG. 13] Illustration showing the protection glass for the portable terminal.
Figure 14:
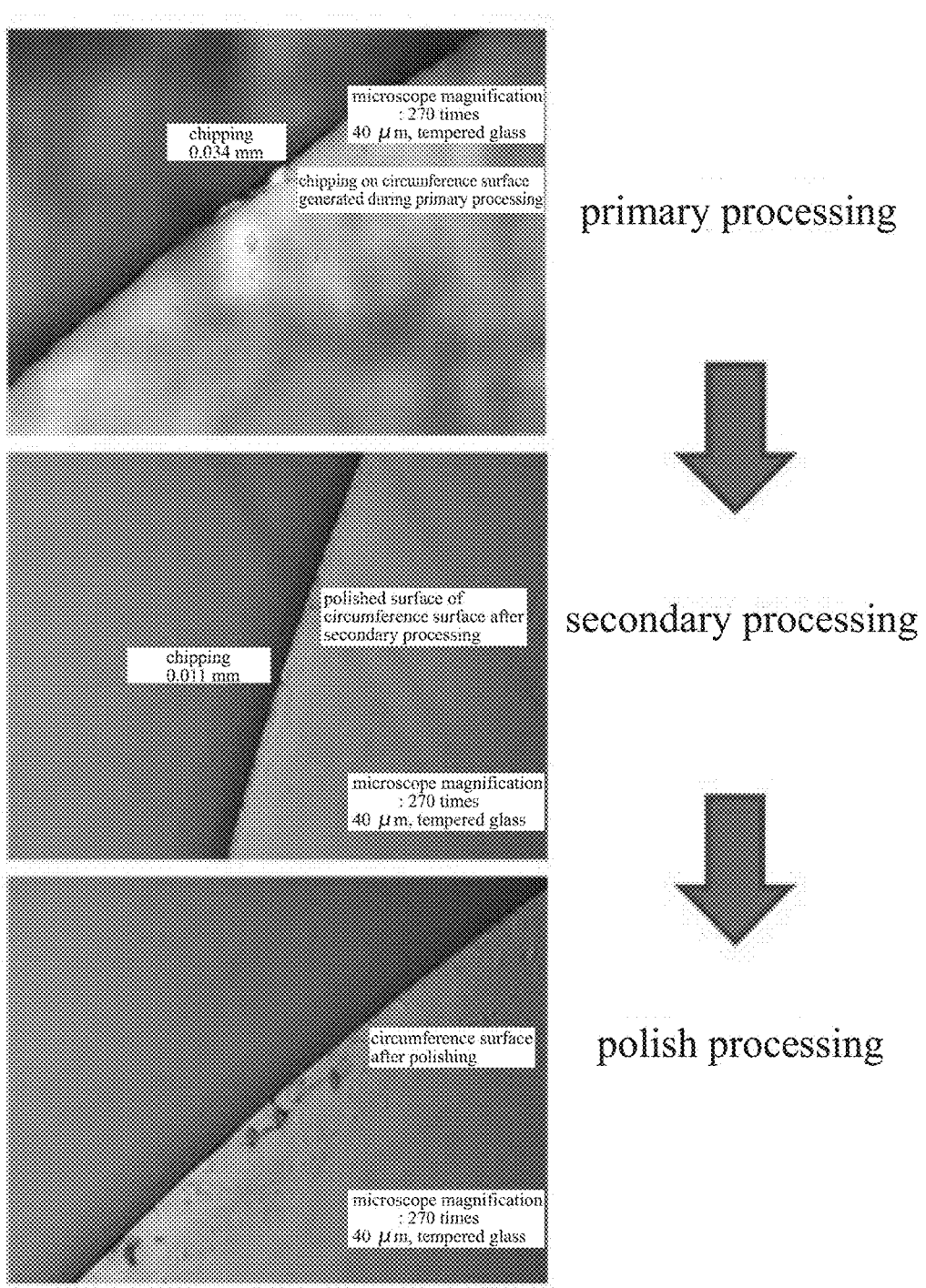
[FIG. 14] Magnified photograph showing the part A of FIG. 13 (magnification: 270 times).
Figure 15:
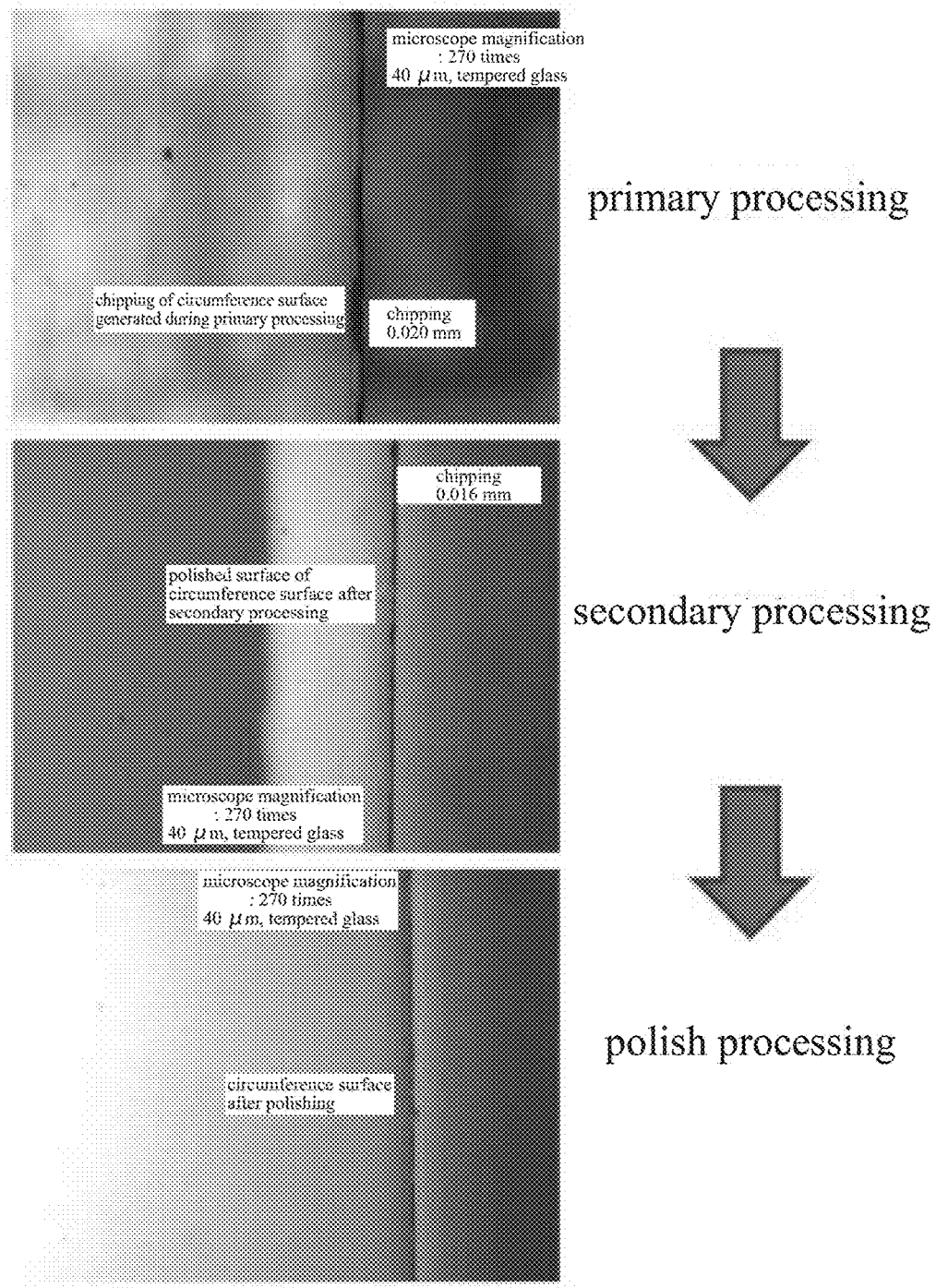
[FIG. 15] Magnified photograph showing the part B of FIG. 13 (magnification: 270 times).
Figure 16:
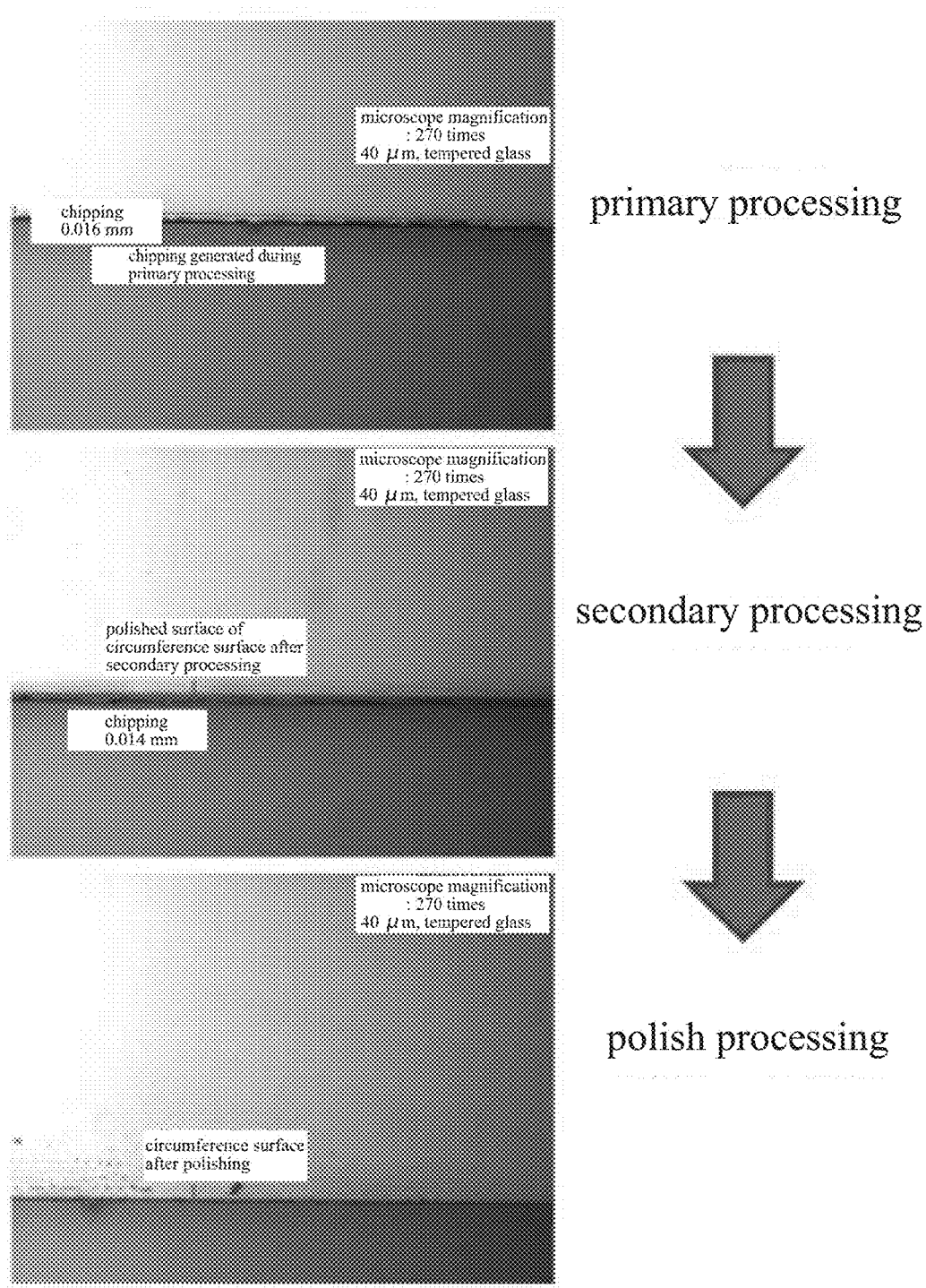
[FIG. 16] Magnified photograph showing the part C of FIG. 13 (magnification: 270 times).
Figure 17:
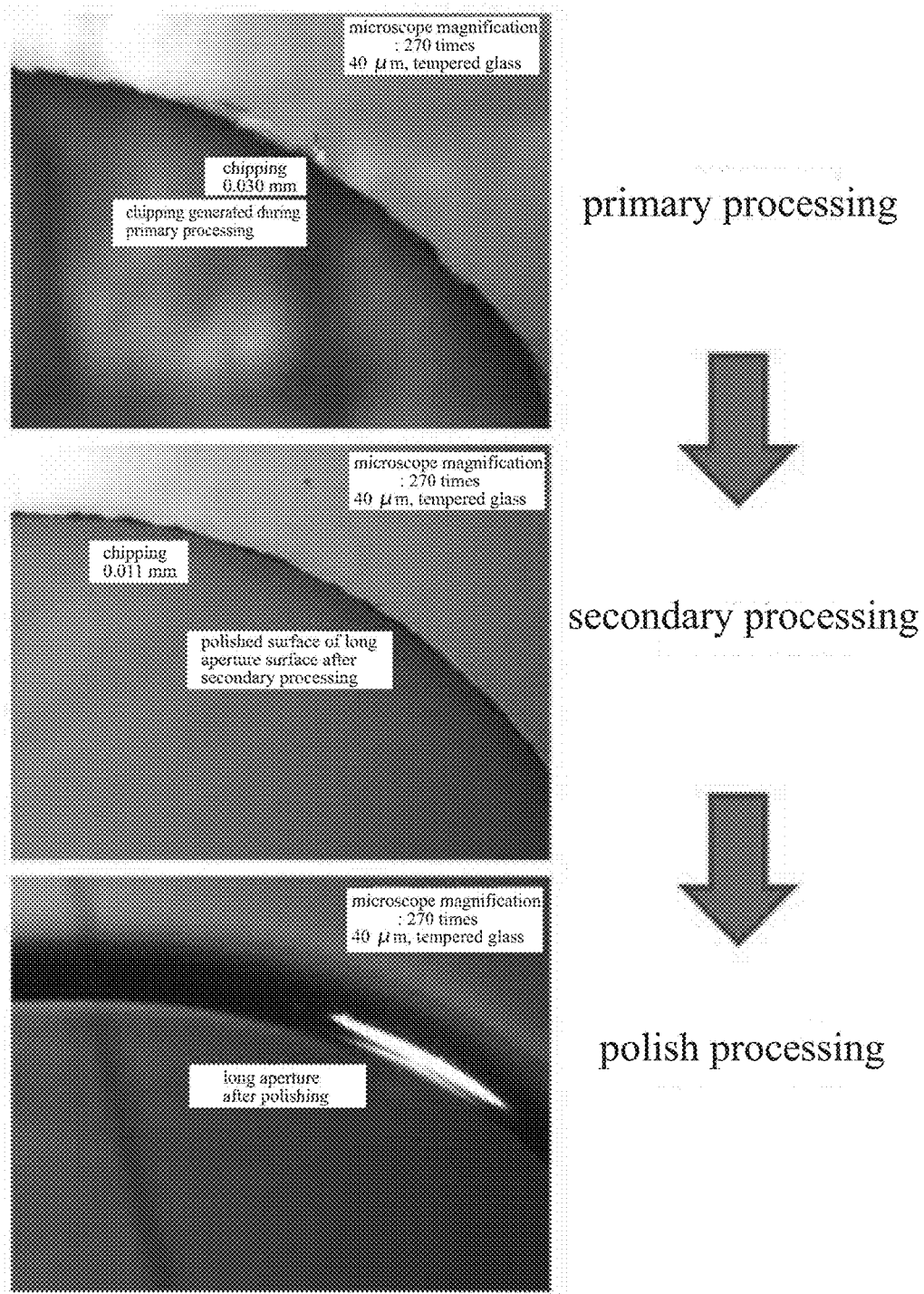
[FIG. 17] Magnified photograph showing the part D of FIG. 13 (magnification: 270 times).
Figure 18:
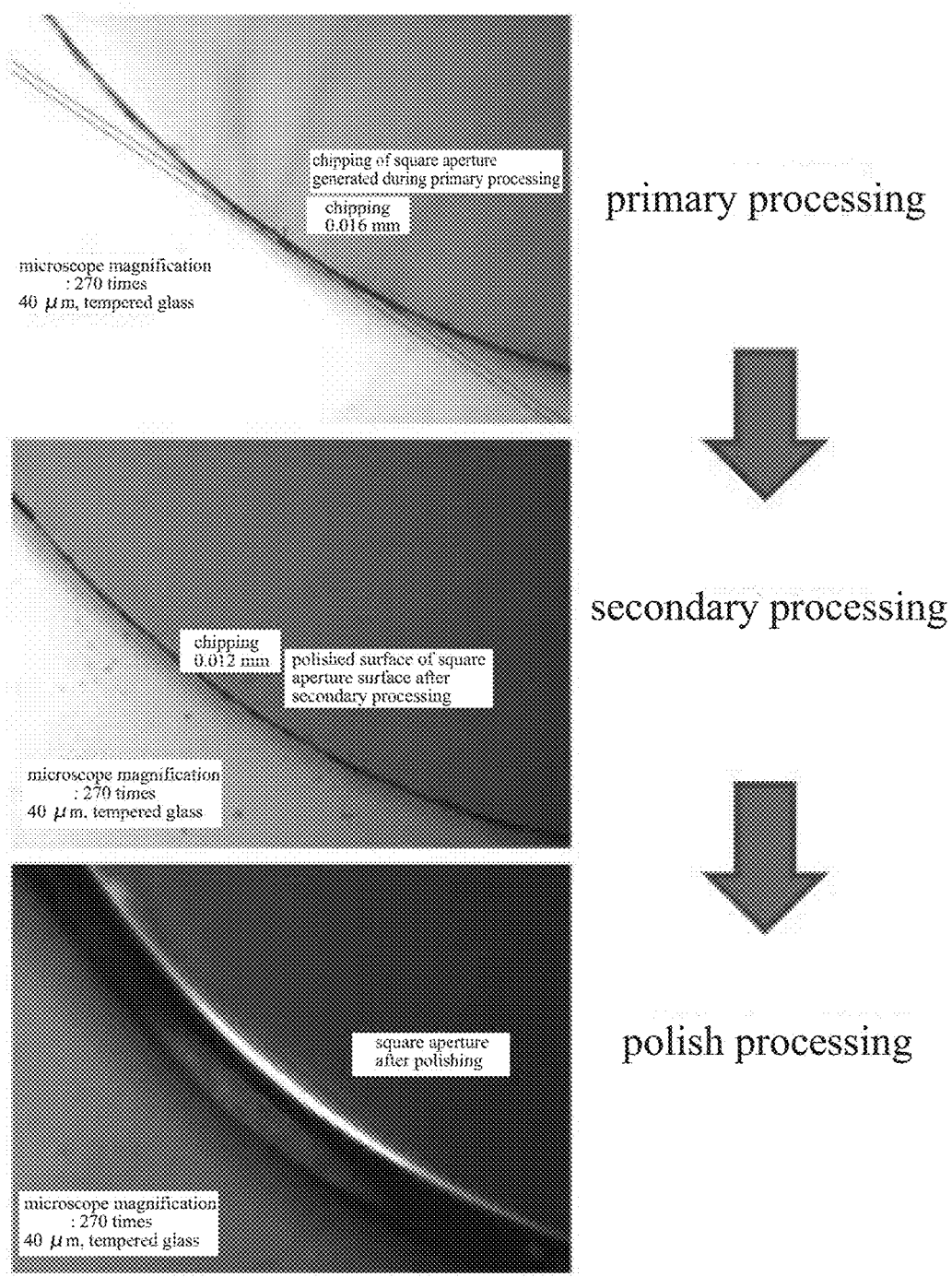
[FIG. 18] Magnified photograph showing the part E of FIG. 13 (magnification: 270 times).

(1) In case of test glass prepared by employing the present method (i) Preparation of test glass Preparation of protection glass 1P for portable terminals acting as the test glass and shown in FIG. 13 was attempted.

(ii) Specific method of preparing test glass of present method and conditions thereof A method of preparing the test glass is the same as the method of processing the above tempered glass. That is, 12 sheets of the tempered glass (mother material was aluminocilicate glass, thickness of mother material was 0.7 mm, thickness of surface reinforced layer was 40 μm, and surface compression stress was 600 MPa or more) having the surface reinforced layer in the shape of a larger plate were stacked and fixed among one another by using a UV cure adhesive. Pieces (stacked layer block 1a) having the same size as that of protection glass of portable terminals were cut out from the stacked sheets. The polish processing (primary processing) of the long apertures 23 and square apertures 24 was conducted onto the above cut-out pieces to prepare primarily processed articles (stacks). Then, the finishing processing (secondary processing) onto the primarily processed articles was performed for chamfering the circumferential surface, the long apertures 23 and the square apertures 24 to prepare secondarily processed articles (stacks). Then, the polish processing was conducted onto the secondarily processed articles, and the respective glass plates of the stacked layer block 1a after the above processing were dipped into warm water for peeling off, thereby obtaining the test glass (for evaluation).

The above-mentioned ultrasonic vibration processing apparatus 4 was employed in the primary processing and the secondary processing, and the conditions thereof are as follows.

Primary Processing Conditions

Processing Device 8

Type: diamond grind stone in form of axis (grain size: #320)

Diameter: 1.5 mm

Feed speed: 60 mm/min.

Vibration amplitude: 8 μm

Number of vibrations: 63 kHz

Sample cycle (response speed) of feedback control; 0.2 msec

Number of rotations: 5000 rpm

Secondary Processing Conditions

Processing device 8

Type: diamond grind stone in form of axis (grain size: #600)

Diameter: 1.5 mm

Feed speed: 60 mm/min.

Vibration amplitude: 5 μm

Number of vibrations: 63 kHz

Sample cycle (response speed) of feedback control; 0.2 msec

Number of rotations: 5000 rpm (iii) Method of evaluating test glass prepared by present method and results of evaluation The processed conditions after the primary processing, after the secondary processing and after the polish processing of the respective parts A to E of the test glasses shown in FIG. 13 were examined.

As apparent from magnified photographs shown in FIG. 14 to FIG. 18 (270 times), the respective parts A to E of the test glass exhibited the excellent processed states in each of the processing stages (after the primary processing, after the secondary processing and after the polish processing).

(2) In case of test glass prepared by employing prior art method (i) Preparation of test glass Similarly to the case of the test glass prepared by the present method, the preparation of protection glass for portable terminals acting as the test glass shown in FIG. 13 was attempted.

(ii) Specific method of preparing test glass by prior art method and conditions thereof Similarly to the preparation of the present method, the stack consisting of 12 sheets in the shape of larger plates (the tempered glass having the surface reinforced layer) adhered among one another was prepared, and the primary processing (cut-out of the stacked layer block 1a, and processing of the long apertures 23 and square apertures 24) onto the stack under the primary processing conditions below was tried. However, a plurality of cracks were generated after the cut-out of the stacked layer block 1 and in the early stage of processing the long apertures 23 during the primary processing. Accordingly, the subsequent processing including the processing of the square apertures 24 in the primary processing was abandoned for the parts (refer to part D and part E in FIG. 13) regarding the aperture processing of the test glass of Comparative Example. Although the secondary processing and the polish processing were conducted onto the part B and the part C among the parts with respect to the circumferential surface (refer to part A to part C in FIG. 13) of the test glass of Comparative Example, the subsequent processing of part A was abandoned because of the crack generation.

Primary Processing Conditions

Processing Device 8

Type: diamond grind stone in form of axis (grain size: #320)

Diameter: 1.5 mm

Feed speed: 60 mm/min.

Vibration amplitude: 8 μm

Number of vibrations: 50 kHz

Sample cycle (response speed) of feedback control; 10 msec

Figure 20:
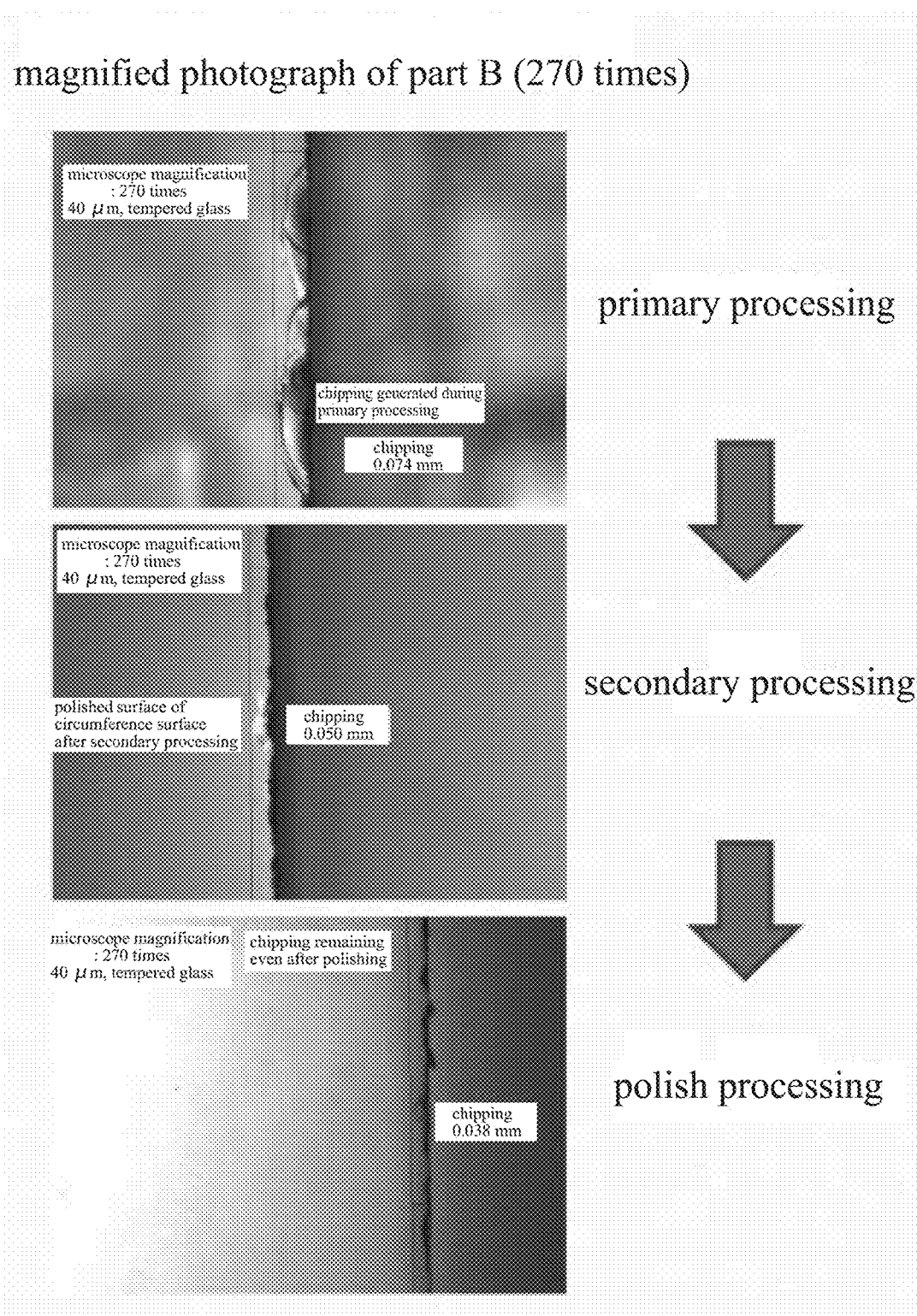
[FIG. 20] Magnified photograph showing the part of the protection glass for the portable terminal of Comparative Example which corresponds to the part B of FIG. 13 (magnification: 270 times).
Figure 21:
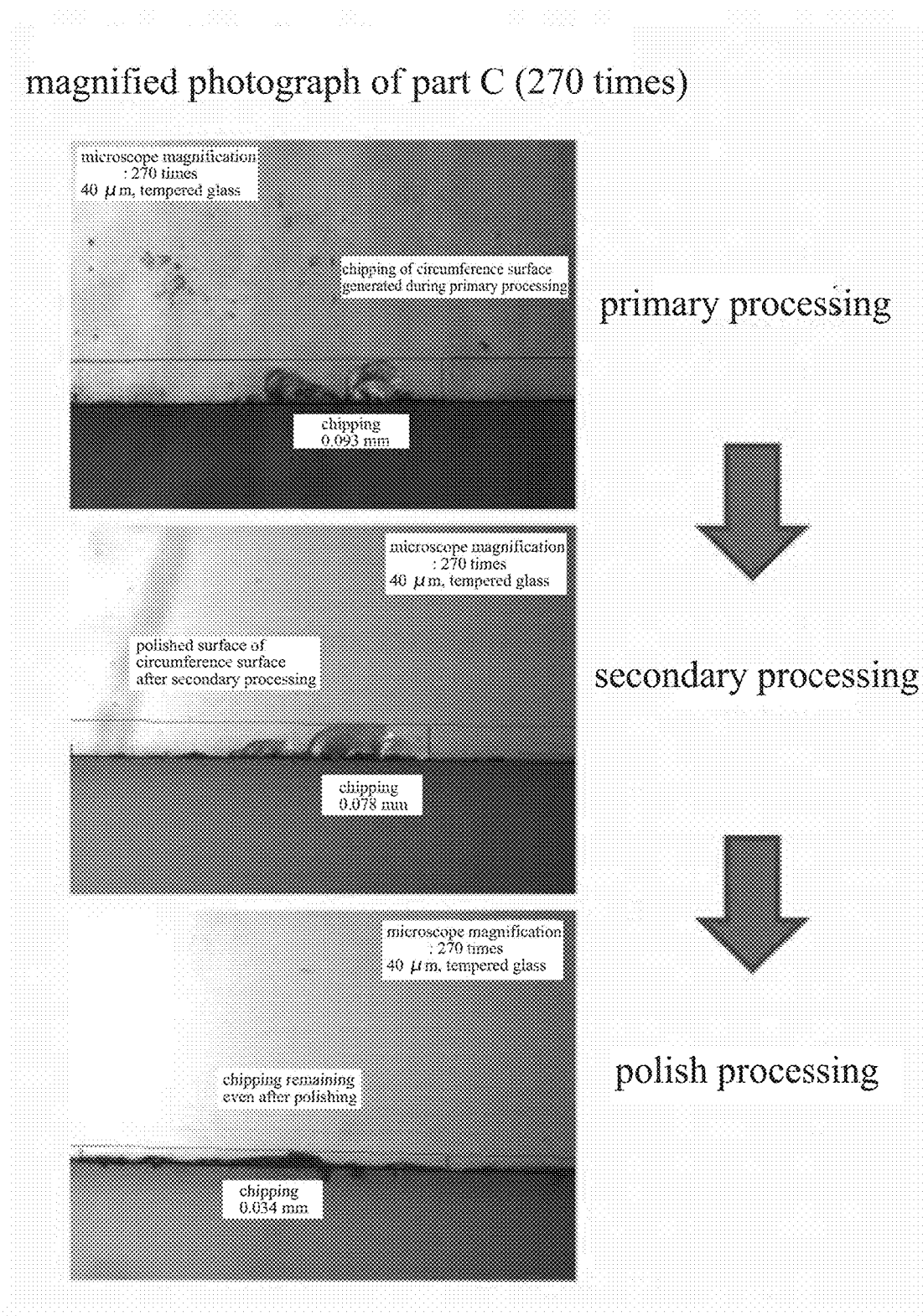
[FIG. 21] Magnified photograph showing the part of the protection glass for the portable terminal of Comparative Example which corresponds to the part C of FIG. 13 (magnification: 270 times).
Figure 22:
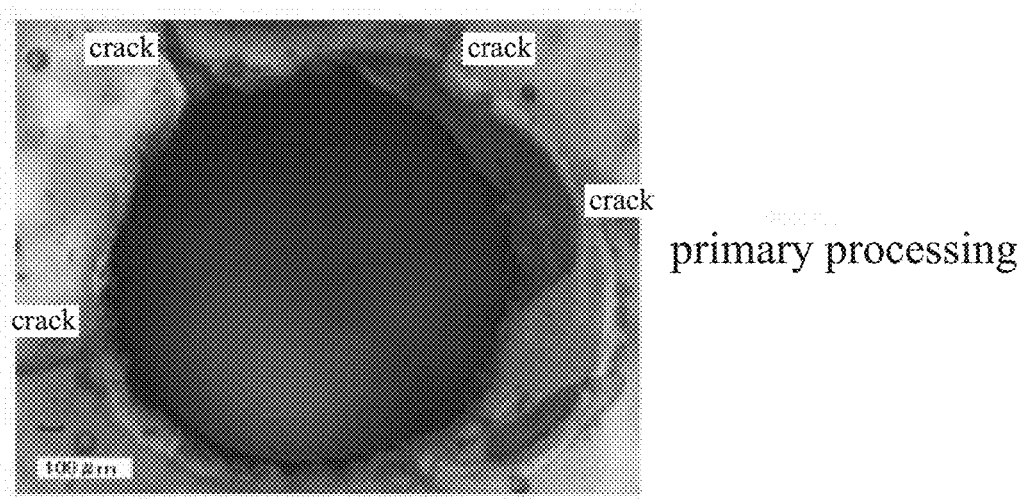
[FIG. 22] Magnified photograph showing the part of the protection glass for the portable terminal of Comparative Example which corresponds to the part D of FIG. 13 (magnification: 90 times).

Number of rotations: 5000 rpm (iii) Method of evaluating test glass of Comparative Example and results of evaluation Examination of the processed conditions after the primary processing of the respective parts A to D (refer to FIG. 13) of the test glass of Comparative Example provided magnified photographs of FIG. 19 to FIG. 21 (270 times) and of FIG. 22 (90 times). Cracks or chippings over a specified degree were generated at the respective parts A to C of the test glass of Comparative Example, and a plurality of larger cracks were generated at the part D so that the quality thereof was too bad to be supplied as a finished article. A larger central aperture in FIG. 22 was made during the initial stage before the formation of the long apertures 23.

DESCRIPTION OF SYMBOLS

1 . . . tempered glass
1A . . . stack (group of stacked glasses)
1a . . . stacked layer block (group of stacked glasses)
3 . . . surface reinforced layer
4 . . . ultrasonic vibration processing apparatus
7 . . . vibration apparatus (vibration mechanism)
8 . . . processing device
9 . . . motor (rotation power source)
16 . . . ultrasonic oscillator (vibration adjusting means)
U . . . control unit (control means)

The invention claimed is:

1. A method of processing a chemical tempered glass having a surface reinforced layer by means of a processing device which is vibrated under rotation thereof,
the method comprising the steps of:
controlling vibration of the processing device in a feedback fashion such that a vibration amplitude and a vibration frequency of the processing device approach a target vibration amplitude and a target vibration frequency, together with setting the target vibration amplitude to be in a range from 3 μm to 9 μm and the target vibration frequency to be in a range from 60 kHz; and to 64 kHz; and
employing a sample cycle of 0.3 msec or less in the feedback control.

2. The method of processing the tempered glass as claimed in claim 1, wherein a number of rotation of the processing device is set in a range from 2000 rmp to 30000 rpm.

3. The method of processing the tempered glass as claimed in claim 1, wherein the chemical tempered glass having the surface reinforced layer includes a group of stacked glasses composed of a plurality of the stacked chemical tempered glasses.

* * * * *